US005558071A

United States Patent [19]

Ward et al.

[11] Patent Number: 5,558,071

[45] Date of Patent: Sep. 24, 1996

[54] IGNITION SYSTEM POWER CONVERTER AND CONTROLLER

[75] Inventors: Michael A. V. Ward; Winfield Hill, Stoneham; Arthur J. Pennell, Lexington, all of Mass.

[73] Assignee: Combustion Electromagnetics, Inc., Arlington, Mass.

[21] Appl. No.: 396,194

[22] Filed: Feb. 24, 1995

Related U.S. Application Data

[63] Continuation-in-part of Ser. No. 206,632, Mar. 7, 1994, abandoned.

[51] Int. Cl.[6] .............................. F02P 3/09; H02M 3/315

[52] U.S. Cl. .............................. 123/598; 363/18

[58] Field of Search .............................. 123/598, 606, 123/620, 634, 637; 363/15, 16, 18, 22

[56] References Cited

U.S. PATENT DOCUMENTS 3,594,627 7/1971 Lesher .............................. 363/18
3,624,484 11/1971 Colyer .............................. 363/18
4,092,709 5/1978 Voigt et al. .............................. 363/18
4,136,659 1/1979 Smith .............................. 123/598
4,677,960 7/1987 Ward .............................. 123/598
4,733,646 3/1988 Iwasaki .............................. 123/598
4,967,037 10/1990 Roberts .............................. 123/598
4,996,967 3/1991 Rosswurm et al. .............................. 123/598
5,207,208 5/1993 Ward .............................. 123/598
5,456,241 10/1995 Ward .............................. 123/598

*Primary Examiner*—Willis R. Wolfe
*Attorney, Agent, or Firm*—Jerry Cohen

[57] ABSTRACT

A high efficiency high power DC to DC power converter and controller system for a CD ignition system with a simple converter controller (8) for controlling a power switch (2) of a transformer (1) operated as a flyback which includes a lossless snubber (6) and simple current sensor (8*a*) for sensing and controlling the power converter current, and further including ignition trigger conditioner (9) and phase conditioner (10) for operating a trigger output circuit (11) based on an octal counter (67) for triggering ignition coil circuits of a preferred distributorless ignition circuit of the hybrid ignition system type.

40 Claims, 2 Drawing Sheets

IGNITION SYSTEM POWER CONVERTER AND CONTROLLER

This application is a continuation-in-part and divisional application of patent application Ser. No. 8-206,632, filed Mar. 7, 1994, now abandoned.

BACKGROUND OF THE INVENTION AND PRIOR ART

The present invention discloses a power converter and controller system for ignition systems for internal combustion engines, particularly high power, high energy capacitive discharge ignition systems for multi cylinder engines. Such ignition is essential to the operation of high efficiency internal combustion engines using the more difficult to ignite dilute mixtures, such as lean mixtures, high residual or high EGR mixtures, and fuel-air mixtures of difficult-to ignite fuels such as alcohol fuels. Such high power high energy ignition delivers power to the mixture at the rate of hundreds of watts versus tens of watts for more conventional ignitions. Total useful energy delivery to the mixture, even under high air-flow conditions, ranges from about fifty millijoules to three hundred millijoules, versus five to thirty millijoules for conventional ignitions.

While the power converter and controller system disclosed herein can be used with any ignition system which requires energy storage capacitor means to be charged to a high voltage from battery voltage, and for delivering the energy to a spark plug in a controlled way, preferably the system is used with hybrid ignition disclosed in patent application PCT/US94/12866 (with U.S. a designated country). The ignition control system is based in part in U.S. Pat. Nos. 4,688,538 and 5,131,376. U.S. Pat. Nos. 4,677,960, 4,774,914, 4,814,925, 4,868,730, and 5,207,208 may be relevant to the ignition application of the invention. The said applications and all said patents are of common assignment with this application. Reference to the above cited applications and patents is sometimes made herein by simply listing the last three numerals of the number as in patent application '632, '866, and patent '538, '376, '960, '914, '925, '730, and '208.

SUMMARY OF THE INVENTION

The present invention discloses a high power, high efficiency, flyback type DC to DC power converter with simple converter controller, and an ignition controller, for capacitive discharge ignition systems for multi-cylinder engines. Such power converter and controller system, referred to henceforth also as the "converter-controller system", is preferably used with a "hybrid ignition", i.e. hybrid capacitive and inductive ignition, which typically requires a DC to DC power converter and controller to charge energy storage capacitors from low to high voltages and then discharges them to produce ignition sparks in spark plugs. For the hybrid ignition the spark duration is in the millisecond range, of one or more milliseconds at low engine speeds, falling to a fraction of a millisecond at high speeds, defining one aspect of the control features of the present invention. The ignition triggering and trigger input phasing aspects of the present invention are common to most type of ignition systems.

A principal feature of the DC to DC converter is the use of low voltage, e.g. 60 volt, high efficiency field-effect transistor (FET) for the main power switch with low leakage transformer means for stepping up the battery voltage to the capacitor discharge voltage of typically about 360 volts, and novel lossless snubber means for controlling the primary transformer winding circuit voltage overshoot produced on the main switch opening and storing the overshoot energy for delivery back to the battery for very high efficiency operation of up to 90% at output power levels of about 100 watts, for a simple circuit employing one FET main power switch and a small transformer, e.g. a transformer employing ETD-34 gapped ferrite core. In addition, a novel simple current sensor connected to the secondary transformer winding sensor is employed, based on sampling the secondary winding discharge current, to provide a set DC primary current level for higher power operation as well as control of the peak currents in the primary and secondary transformer windings.

For controlling the power converter a particularly simple circuit is employed using two comparators with diode and transistor means to provide oscillation for turn-on and turn-off of the main power switch, for regulation of output voltage, for shut-off of the power converter at low output and high input voltages, and other controls.

The ignition controller is comprised of a trigger input circuit for accepting and conditioning an ignition input trigger firing signal, phase input circuitry for accepting and conditioning input phase signals as required for true distributorless ignition systems (of one coil per plug), a gate circuit for producing a variable ignition firing period Tg with engine speed, a counter for steering ignition firing signals to each switch means Si/SDi of primary winding of coils Ti, i=1,2,3, . . . , and suitable circuit components and design to insure reliable turn-off of switch means Si/SDi (which are preferably SCRs) which do not have a negative bias imposed during turn-off as a result of the unidirectional decaying inductive spark current of the preferred hybrid ignition feature. This is accomplished by designing the spark firing period control, i.e. the gate "Tg", to be longer than the current discharge period "Tc", and insuring that the power converter is turned off during this time period Tg. The power converter controller employs a "soft start" of the power converter, within ½ millisecond, following switch means Si/SDi turn-off. For the switch means Si/SDi a preferred dual SCR type switch is used which is triggerable and controlled by the ignition control circuit.

In the preferred mode of operation, the "converter-controller system" disclosed herein uses a hybrid ignition which, in turn, is used in engines using high flow velocities at the ignition site, during ignition, to make better use of the present system and preferred hybrid ignition.

Other features and objects of the invention will be apparent from the following detailed description of preferred embodiments taken in conjunction with the accompanying drawings.

DESCRIPTION OF PREFERRED EMBODIMENTS

Figure 1:
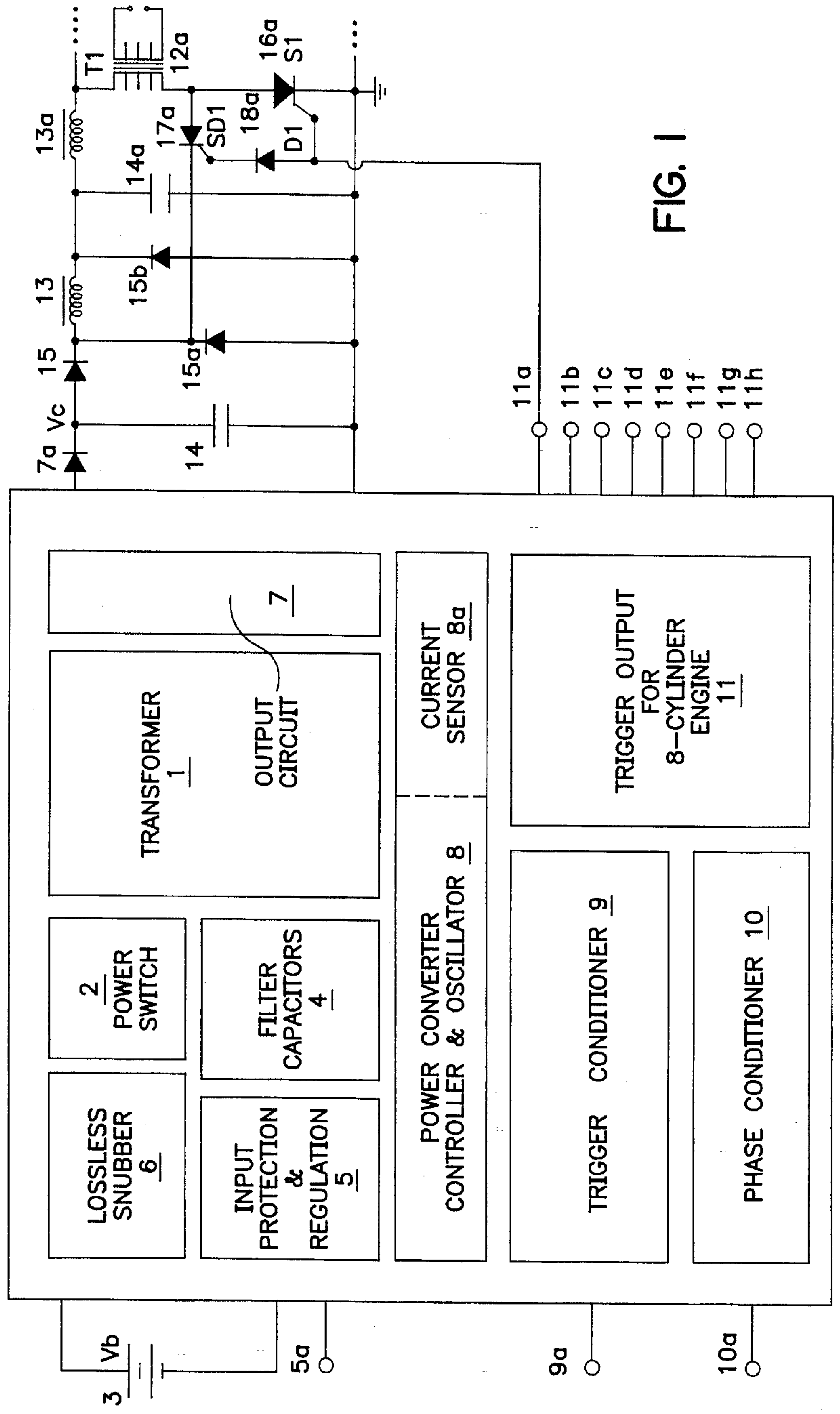
FIG. 1 is a circuit diagram, partially block diagram and partially detailed circuitry, of the power converter and controller circuit disclosed and a preferred embodiment of the hybrid ignition system for a multi-cylinder engine.

FIG. 1 is a circuit drawing of the power converter controller system shown in block diagram form, and the preferred ignition system, the hybrid dual discharge ignition system disclosed in the cited patent applications, shown in more detailed circuit form. The power converter controller system comprises a step-up transformer 1, a power switch 2 for controlling the current flow in the primary winding of transformer 1 from an electrical power supply, i.e. a battery 3 of voltage Vb shown, input filter capacitors 4 for minimizing the inductance of the transformer 1 primary winding circuit, input protection and regulation circuitry 5, a lossless snubber 6 for storing the excess energy upon power switch 2 opening and delivering the energy back to the battery 3, output circuit 7 which handles the high voltage produced by the transformer 1 and delivers it to an output circuit through an output diode 7*a*, power converter controller and oscillator 8 for controlling and regulating the operation of the power converter, and a current sensor circuit 8*a* for setting the peak current level, and any DC level, in the transformer 1 and power switch 2.

The ignition spark firing control is provided by the trigger conditioner 9 with trigger input 9*a* for accepting an ignition firing signal and conditioning it including creating an ignition time duration Tg, and a phase conditioner 10 with phase input 10*a* for accepting a phasing signal required for a true distributorless ignition (one coil per plug) of a 4-stroke engine to specify the firing order of the outputs of the trigger output controller 11 (e.g. an octal counter with outputs 11*a* to 11*h* for an 8-cylinder engine). Some or all of the outputs 11*a* to 11*h* are used to trigger the switches of the discharge circuit, the preferred embodiment of which is shown in detailed circuit form in the drawing as a true distributorless dual discharge hybrid ignition disclosed in the cited patent applications, except for the ignition firing switches Si/SDi which are shown in greater detail here.

The hybrid ignition dual discharge circuit shown in true distributorless form comprises an ignition coil 12a, designated as T1, as one of a number "n" of parallel cascaded ignition coils T1, T2, . . . Tn, with the symbol Ti used to designate an arbitrary coil, i.e. the "ith" coil, of an arbitrary number of "n" coils. The initial, high frequency part of the dual discharge circuit comprises coil Ti with resonating inductor 13*a* (inductance Le1), capacitor 14*a* (capacitance C1) with diode 15*b* shunting the capacitor 14*a* to provide unidirectional (DC) spark discharge, and control switch 16*a*, designated as S1 of switch Si for coil Ti, which is preferably an SCR as shown, which initiates the spark discharge when its trigger receives a signal from the trigger output controller 11 (when output 11*a* goes high). The lower frequency part of the dual discharge circuit comprises inductor 13 (inductance Le0), capacitor 14 (capacitance C0), isolation diode 15, control switch 17*a*, designated as SD1 of switch SDi for coil Ti, which conducts when both capacitors 14 and 14*a* have depleted their charge and a circuit is formed through switch 17*a*, the inductors 13 and 13*a*, and the primary winding of the coil T1. Switch SD1 (of SDn) is preferably an SCR, as shown, with its anode connected to the anode of switch S1 (of Sn), its cathode connected to the high voltage end of inductor 13, and its trigger including a high voltage diode 18*a*, designated as D1 of Dn, with its cathode connected to the trigger input of SCR 17*a* to prevent the primary circuit positive voltage Vc from being grounded. The anode of diode 18*a* is connected to the trigger of S1 so that both are triggered when the output 11*a* of controller 11 goes high and stays high for a period longer than that required for capacitors 14, 14*a* to give up their charge, equal to about a quarter period of the resonance of capacitor 14 and inductor 13. Fast diode 15*a* is optionally used to prevent voltage of capacitor 14 from going negative if shunt switch 17*a* (any of switches SDi) does not turn on fast enough. The dual switch composed of SCRs Si, SDi, and diode Di, may be made up of a single four terminal device with one anode, one trigger, and two cathodes.

Operation of the ignition system has been disclosed in the cited patent applications, and for the present purposes the output voltage Vc to which the output capacitors 14, 14*a* are charged will be assumed at approximately 360 volts, although other voltages may be employed with appropriate modification of component ratings and redesign of the transformer 1 and the control circuitry. The term "approximately" as used throughout this application means within plus or minus 25% of the value it specifies.

For the typical automotive application suitable circuit parameters are:

Vc=360 volts, C0=3.6 uF, Le0=40–80 uH, C1=1.6 uF, Le1=5 uH, where uF and uH designate microfarads and microhenries respectively, and the term "equal", or the equality sign, or the statement of a given number, means within plus or minus 10% of the number unless otherwise designated. A suitable core for the coil of the preferred stress-balanced coil, of the cited patent applications, is an ETD-49 ferrite core with segmented bobbin and side-by-side winding with primary turns Np equal to 11 (10 to 12) and secondary turns Ns of 600, with the secondary winding wound in preferably 5 segmented sections.

Figure 2:
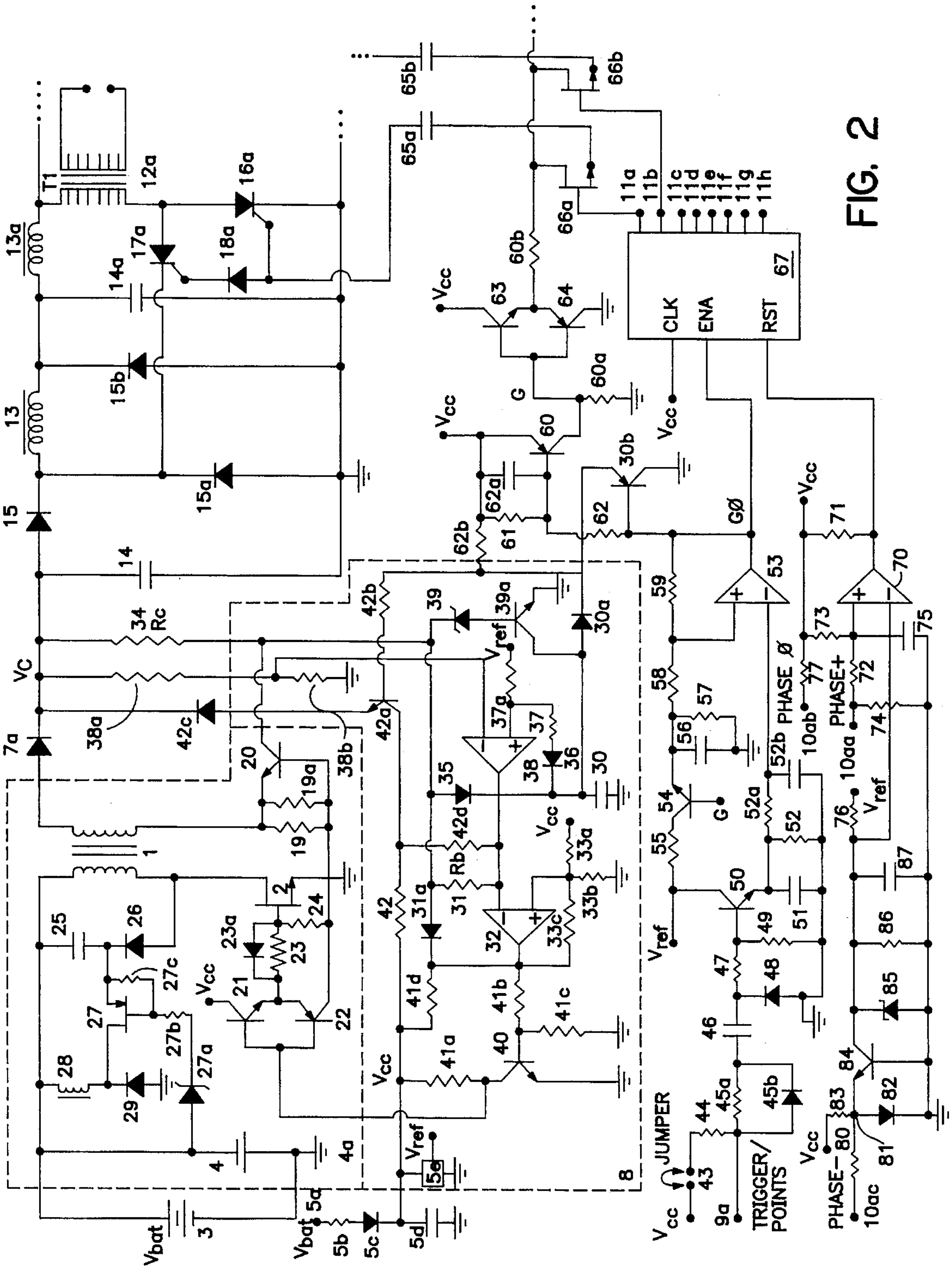
FIG. 2 is a more detailed more complete circuit drawing of a preferred embodiment of the power converter and controller circuitry for a distributorless ignition system of the hybrid ignition type.

FIG. 2 is a more complete, more detailed circuit drawing of a preferred embodiment of the power converter and controller including control features for the flyback power converter circuit shown for supplying power and controlling firing of the preferred hybrid ignition system shown. Like numerals correspond to like parts with respect to FIG. 1.

The flyback power converter includes the flyback transformer 1, which for a 100 watt application can be designed around an ETD-34-250 gapped core (of 1 square cm core area), with 7 primary turns Np for primary inductance Lp of 12 uH and a turns ratio N of approximately 12 for an assumed main power switch 2 or switching FET transistor of 60 volt rating, an output voltage of approximately 360 volts (the preferred automotive case), and a peak current through the primary winding of transformer 1 of approximately 16 amps. Primary winding is preferably Litz wire wound in one layer on top of the secondary winding, which is preferably 28 to 32 gauge (AWG), also wound in one layer to fit the bobbin winding length to minimize leakage inductance Lpe. For higher power, an ETD-39-250 or other transformer core can be used, and the parameters adjusted to satisfy the conditions of the application, as is known to those versed in the art.

The drive for FET switch 2 is provided by a transistor pair 21 and 22 to provide turn-on of FET 2 when a positive voltage is supplied to the bases of transistors 21, 22 to charge the gate of FET 2 through resistor 23 (of low resistance value of about 10 ohms), and turn off FET switch 2 when the bases are pulled low and gate of FET 2 is rapidly discharged (for minimum switching loss) through diode 23*a* and transistor 22 which is preferably a fast switching transistor with several amps peak current rating. A resistor 24 is placed between the FET 2 gate and ground.

For the snubber of the flyback a snubber capacitor 25 and diode 26 is used as is known to those versed in the art. In this case a lossless (or low loss) snubber circuit is provided by means of transistor switch 27 (P-type FET shown) and inductor 28 and diode 29. In operation, immediately following FET 2 turn-off, snubber capacitor 25 (typically about 0.1 uF capacitance) charges up to a design voltage (e.g. the approximately 60 volt rating of the FET 2), and begins to discharge through inductor 28 and switch 27 which is in the on-state through the action of the zener 27*a* (e.g. a 24 volt zener) and divider resistors 27*b*, 27*c* (of typical value a few hundred ohms each) which turn FET 27 on at a voltage a few volts greater than sum of the zener voltage plus the supply voltage Vb. Switch 27 then turns off at a time less than the off-time of the power converter and the energy stored in inductor 28 is delivered to the battery 3 (before main FET switch 2 is turned on again) through the diode 29 whose anode is connected to ground and allows the inductor 28 to form a circuit with the battery 3.

For the power converter, the typical operating frequency is about 60 kilohertz (kHz), where the term "about" is defined to be within one half and twice the value it qualifies, i.e. from 30 to 120 kHz. In this frequency range the power converter off-time is about 5 usecs leading to a value for the inductance of inductor 28 of about 60 uH.

The snubber can be simplified with some accompanying loss by replacing the switch 27 and its sensing zener 27*a* and resistors 27*b* and 27*c* with a single zener (of zener voltage approximately 30 volts) connected in place of switch 27 with its cathode at the high voltage node of capacitor 25 and its anode at the high voltage point of inductor 28 (which is connected to cathode of diode 29).

The power converter controller 8 is based on charging a timing capacitor 30 (of capacitance Ct) from the output voltage Vc through a resistor 34 (resistor Rc) which provides a required decreasing charging time with increasing output voltage, defining an off-time Toff. The on-time Ton represents the discharging of capacitor 30 through a resistor 31 (of value Rb) connected to the output of a comparator 32 through an isolation diode 31*a*. The timing capacitor 30 is connected to the inverting input of a comparator 32, and the non-inverting input has a reference voltage obtained from the divider resistors 33*a*, 33*b*, 33*c* (of preferably approximately equal value in the tens of thousands of ohms range) which make the non-inverting input flip between ⅓*Vcc and approximately ⅔*Vcc depending on whether the output of comparator 32 is low or high (where "*" designates multiplication). The normally high output of comparator timer 32 corresponds to the off-time (Toff) versus the on-time (Ton).

The comparator (32) timer oscillator circuit, i.e. the "Timer", can be designed to turn main switch 2 on and off, with or without a DC current. Preferably, operation with DC is employed, which is set by the sensor circuit 8*a* comprised of the NPN sensor transistor 20, sense resistor 19 connected between the secondary winding of transformer 1 and ground, and temperature sensitive thermistor 19*a* (with a resistor in series with it) connected across sense resistor 19 to partially compensate for the temperature characteristics of the base-emitter junction voltage of the sensor transistor 20. The base of sensor transistor 20 is at ground potential and its emitter at the high side of resistor 19 of value approximately 0.5 ohms for the present application, so that the transistor switches when its base-emitter voltage rises above 0.62 volts and the current through the secondary is above the threshold current "Ith" (approximately 1.2 amps in the present case). The collector of sensor transistor 20 is tied to the low side of the off-time resistor Rc (34) to divert capacitor 30 charging current when the sensor current rises above the current Ith to increase the off-time and stabilize operation.

In a typical case of 100 to 150 watts of output power an ETD-39-250 core is used for transformer 1, and the on and off time resistors Rb and Rc are set at 18 K (18 kilohms) and 360 K respectively, and a 3.3 ohm thermistor (at 25 degrees C.) is used for thermistor resistor 19*a* (which has a 0.5 ohm resistor in series with it). For 14 volts input voltage (Vb) the current has a peak of 20 amps and a DC level of approximately 8 amps, and a frequency of oscillation of approximately 60 kHz, i.e. an on-time of 12 usecs and an off-time of 5 usecs, which is a good design frequency, with an output power over 100 watts at an efficiency between 88% and 90%.

The timing (charging) resistor 34 is connected at one end to the voltage node Vc and at the other end to a shunting diode 35 which shunts the other timing resistor 31 of resistance Rb. In operation, capacitor 30 is charged by voltage Vc through resistor 34 and diode 35 representing the off-time Toff, to raise the capacitor 30 voltage from ⅓*Vcc (designated as V1) to approximately ⅔*Vcc (designated as V2). The "Timer" then switches, and capacitor 30 discharges (with on-time Ton) through resistor Rb to ⅓*Vcc (V1). As the voltage Vcc drops (which is just below the battery voltage Vb and tracks it), the on-time Ton increases and the off-time Toff decreases to help reduce the relative drop of peak current with input voltage Vcc drop that would otherwise occur. However, the sensor circuit 8*a* will provide most of the peak current control by reducing the off-time Toff with falling Vcc since sensing transistor 20 will shunt off less capacitor 30 charging current with falling Vcc (i.e. with falling secondary transformer current through sensor resistor Rsense defined by the parallel combination 19/19*a*). An approximate expression for the on-time Ton is:

$$Ton=Ct*Rb*\ln[(V2-Vd)/(V1-Vd)]$$

where "in" is the natural logarithm and Vd is the voltage drop across diode 31*a* (plus the small collector-emitter Vce drop of the comparator output transistor). The small effects of resistors 37 and 42*d* are not included in the expression. For:

Ct=0.001 uF, Rb=18 K, Vd=0.6, Vcc=12 volts,

V2=0.6*Vcc=7.2 volts, V1=0.33*Vcc=4.0 volts, then

Ton=12.0 usecs (as mentioned above).

For a preferred value of primary inductance Lp of 12 uH, the peak oscillating or AC current Iac of the power converter (for Vb=13 volts) is given by:

$$Iac=Vb*Ton/Lp=13*12/12=13 \text{ amps}$$

and for a DC current Idc of approximately 8 amps, e.g. 7 amps, the total peak current is 20 amps as mentioned above.

At 360 volts output voltage (Vc) the time required Toff for the transformer secondary current Is to drop to zero is: $Toff=Is*Ls/Vc$ where Is=Iac/N, Ls=Lp*(N2), where N is the turns ratio and "" designates exponentiation.

$$Toff=[(Iac/N)*Lp*(N**2)]/Vc$$

$$Toff=Iac*LP*N/Vc$$

which for Iac=13 amps, N=12, Lp=12 uH, and Vc=360, gives Toff=5.2 usecs (as mentioned above).

The off-time Toff of the circuit is given by:

$$Toff=Ct*Rc*\ln[(Vs-V1)/(Vs-V2)]$$

where Vs is the transformer 1 output voltage of maximum regulated value Vc (e.g. 360 volts). For the case where Vcc/Vs is much less than one, the above expression simplifies to:

$$Toff=Ct*Rc*[(V2-V1)/Vs]*[1+(V2+V1)/(2*Vs)]$$

which for the above relations of V1, V2 to Vcc, becomes:

$$Toff=0.27*Ct*Rc*[Vcc/Vs]*[1+Vcc/(2*Vs)]$$

which shows the inverse relation of Toff to Vs.

For Vs=Vc=360 volts, Vcc=13 volts, Rc=360 K, then:

Toff=3.6 usecs

This is about 30% below the off-time Toff calculated above. The reason for this difference relates to the fact that a DC current level Idc is used as part of the design as set by the sensor circuit 8*a*. The circuit design off-time Toff must be less than the current decay off-time Toff to allow for DC current level build up. As the secondary current Is builds up beyond the sensor current threshold Ith, more and circuit charging current that charges the timing capacitor 30 through resistor Rc is diverted by the sensor transistor 20 until the time associated with that diverted current equal the difference between Toff and Toff, designated as dToff, and equal to 5.2 usecs minus 3.6 usecs, or 1.6 usecs in this case, and stable operation is established with a DC current component Idc. The DC current level comprises two components, the current corresponding to the time dToff ((1.6/5.2)*13=4.0 amps) plus the current level above Iac at which the sensor circuit begins to operate, i.e. to divert current as determined by the sensor resistor Rsense and the base-emitter voltage Vbe of the sensor transistor 20, i.e. 3 amps in this example, or a total peak current Ipk of 16 amps, for a total stable DC current Idc of 7 amps. Either increasing dToff or reducing the sensor resistor Rsence will increase the stable DC current Idc.

Zener diode 39 is a voltage limiting diode, preferably a 9.1 volt zener, which provides over-voltage protection and high battery voltage shut-off of the timer oscillator and power converter. That is, if the battery voltage rises above, say, 18 volts (and Vcc is 16 volts), the capacitor reset voltage rises to above 0.6*16, or above 9 volts, and the timing capacitor 30 cannot be charged to the maximum required switch level of above 9 volts because of the zener 39, so the oscillator stays in the "off" state. The anode of the zener is connected to the base of NPN transistor 39*a* whose emitter is grounded and collector connected to timing capacitor 30 to give a sharper turn-off, or pulling low, of capacitor 30.

Since the "Timer" is operated in a reverse mode, an inverting output circuit is required, comprised of a NPN transistor 40 with its emitter to ground and its collector connected through pull-up resistor 41*a* to Vcc and its base connected to the comparator 32 output through a base resistor 41*b*. A base emitter resistor 41*c* is also included and output of comparator 32 is connected to Vcc via pull-up resistor 41*d*. Transistor 40 inverts the comparator oscillator timer output node and supplies current to the driver transistors 21, 22 of main FET switch 2. In this way, the power converter is provided with the required "on-time" Ton drive for, say, 16 amps peak current, and with the required "off-time" Toff drive as a function of the output voltage (which is modulated by the sensor circuit 8*a* to set the peak current and DC level).

In this controller operation there is the further advantage that if Vc falls below approximately ⅔*Vcc the charging capacitor 30 can never charge up and the output stays low to provide a built-in low output voltage shut-off. For power converter start-up following spark discharge, the discharge capacitors 14, 14*a* are charged in a fraction of a millisecond to above approximately ⅔*Vcc from the supply Vcc through resistor 42 and transistor 42*a* (whose emitter is connected to Vc through a high voltage isolation diode 42*c*) controllable by the ignition firing to keep it off during spark firing through turn-on of shut-off transistor 30*b* pulling base resistor 42*b* of transistor 42*a* to ground. Shut-off PNP transistor 30*b* (whose collector is grounded) holds timing capacitor 30 low through diode 30*a* during spark firing. Power converter turn-on is speeded up by partial charging of timing capacitor 30 directly through resistor 42*d* (supplied by voltage Vcc) of value about one half of the charging resistor Rc and resistor 37 (and diode 36) for low input voltages. Resistors 37 and 37*a* produce hysteresis for output regulation. Regulation of output voltage Vc is controlled by comparator 38 whose inverting input is connected to a voltage divider made up of resistor 38*a* (e.g. 360 kohms for 360 volts output) and resistor 38*b* (e.g. 5 kohms for a 5 volt reference Vref on the non-inverting input of the comparator 38).

In FIG. 2 is shown the ignition trigger conditioner 9 to control ignition firing. The trigger conditioner operates either with a positive trigger pulse produced electronically or by the opening of conventional mechanical points. In the case of a trigger pulse there is no "jumper" connected across terminals 43. The positive input pulse is then coupled through diode 45*b*, capacitor 46, and resistive divider 47 and 49 to the base of transistor 50. In the case of conventional points, a jumper is connected across terminals 43 with resistor 44 of value about 220 ohms. Upon points opening, the rising voltage on input 9*a* is again coupled through diode 45*b*. In series capacitor 46 differentiates the signal producing a short positive pulse which is applied to the base of transistor 50 through and resistor divider 47 and 49. If the rising edge is noisy, or if there is bounce on points closure, capacitor 46 discharges slowly through resistor 45*a* (typical value 22 K) because diode 45*b* is reverse biased (debounce circuit). Diode 48 with grounded anode protects transistor 50 from a negative base voltage when the points reclose or the electronic trigger pulse goes negative. The collector of transistor 50 is connected to Vref and its emitter is connected to capacitor 51 (Csig) for rapid charging to voltage Vref by the trigger pulse. Shunting the capacitor 51 is timing resistor 52 (Rsig) defining a decay time constant Tsig=Rsig*Csig comprising a pulse stretching circuit. The emitter of transistor 50 is connected to the inverting input of comparator 53. Typical values for Rsig and Csig are 47 K and 0.022 uF. When the voltage at the inverting input to comparator 53 exceeds the voltage at the non-inverting input, a negative going output pulse is produced at G0.

To shorten the pulse at G0 with increasing repetition rate (high RPM of the engine), a second timing circuit is incorporated made up of an NPN transistor 54 with its collector connected to Vref through charging resistor 55 (27 K) and its emitter connected to a timing capacitor 56 (0.33 uF), which is returned to ground, shunted by a discharging timing resistor 57 (68 K), which values are selected for this particular application. The emitter of 54 is connected to the non-inverting input of comparator 53 through an isolation resistor 58. In operation, upon triggering, capacitor 52 charges to Vref (less the transistor Vce) and the inverting input of comparator 53 also charges to Vref but with a delay in the microseconds range introduced by series resistor 52*a* (say of value 100 K) and capacitor 52*b* to delay the enable (ENA) input to the counter 67 with respect to the reset input (RST) input. The signal on the inverting input then decays with a time constant Tsig while the non-inverting input rises towards Vref by charging capacitor 56 through transistor 54, which is on. The output of comparator 53, which is switched to a low state (G0), stays in the low state until the two levels intersect, within a fraction of a millisecond to a few milliseconds. The output of the comparator then returns to its normal high state, transistor 54 (whose base is driven by the complement G of the comparator output G0) turns off, and capacitor 56 discharges at the long time constant, reaching a level proportional to the triggering rate or engine speed. The output G (and G0), designated as the spark trigger "gate", is thus modulated (reduced) with engine speed, ranging from several msecs at low speeds to about 1 msec or less at high speed (for Tsig equal to a few milliseconds).

Comparator 53 output is connected to Vcc via series resistors 61 and 62, as is its non-inverting input via a large (e.g. 1 megohm) hysteresis resistor 59 which sets a small threshold voltage at the non-inverting input. The output of comparator 53 controls the power converter controller timing capacitor 30 through its direct connection to the base of control transistor 30*b* to turn-off the power converter when the ignition is firing (when the output of the comparator goes to the low state G0).

Comparator 53 output drives an inverting stage made up, in part, of series resistor 62 connected to the base of PNP transistor 60 whose emitter is connected to Vcc and collector to the bases of drive transistors 63 (NPN transistor with collector to Vcc) and 64 (PNP transistor with collector to ground). The base of transistor 60 is connected to its emitter by resistor 61 paralleled by capacitor 62*a* and also to G0 by resistor 62. When the voltage G0 switches to the low state (resulting from a trigger signal), counter 67 immediately advances to its next position. Resistor 62 and capacitor 62*a* delay the turning on of transistor 60 by a few microseconds to allow the output of counter 67 to stabilize before the collector of transistor 60 goes positive driving the bases of drive transistors 63 and 64.

The emitters of drive transistors 63 and 64 are interconnected and supply the voltage for the ignition triggering of the all the SCR pairs Si/SDi, or 16*a*/17*a* (S1/SD1) shown in this case for coil T1, through resistor 60*b*. Output steering FETs 66*a*, 66*b*, . . . , driven by octal counter 67, steer the supply of the trigger voltage to the various triggers of the SCR pairs via optional capacitors 65*a*, 65*b*, . . . , of capacitance the order of magnitude of 1 uF.

For a distributor system the emitters of drive transistors 63, 64 would be directly connected to a capacitor 65*a*, producing a positive pulse to the trigger of the SCR on spark firing (beginning of gate G) and a negative pulse at the end of gate G. For the distributorless ignition case shown the steering (FET) switches 66*a*, 66*b*, . . . , have their gates connected to the outputs of a spark steering counter 67. The three main inputs of the counter are the clock input (CLK) which is connected to Vcc, the enable (ENA) input which is connected to the output of the comparator 53 of the trigger circuit 9, and the reset (RST) input which is connected to the output of the phase conditioner circuit 10 which resets the counter. At the beginning of every firing cycle of all the outputs, a phase signal is received at the reset pin (RST) of the counter which resets the outputs to begin another complete firing cycle to operate the distributorless ignition.

The phasing circuit 10 is required for true distributorless ignition (one coil Ti per spark plug) for a four stroke engine to determine which cylinder should be firing in which complete crank cycle of the otherwise identical two crank cycles making up the four strokes. Such a signal is obtainable from the engine cam position, as a positive signal (Phase+) applied to input 10*aa*, a connection of the input 10*ab* to 10*aa* (designated as Phase0), or a negative signal (Phase−) applied to an input 10*ac*.

Switching or actuation of the phase circuit takes place when the output of comparator 70, which is taken to Vcc through pull-up resistor 71, changes from its normally low state to a high state, which is applied to the reset input of the counter 67. The inverting input of comparator 70 is set at a value determined by the resistive dividers 76 and 86, which for equal values of 100 K each places a voltage ½*Vref (or 2.5 volts for Vref=5 volts) at the inverting input. For a positive phase signal (Phase+) actuation takes place when the a positive signal larger than ½*Vref is applied to the non-inverting input of the comparator through a resistor 72. The non-inverting input of the comparator is normally kept low (at about 1 volt above ground and below ½*Vref) through the divider made up of resistor 73 connected between Vcc and the non-inverting input and the series resistances 72 and 74 which connect to ground (placing a voltage equal to Vcc*[(R72+R74)/(R72+R74+R73)] at the non-inverting input (where R72, R74, R73, designate the values of resistors 72, 74, 73, with can typically have the values 3.3 K, 1 K, and 27 K respectively, among other values). A high frequency roll-off capacitor 75 is placed between the non-inverting input and ground to reduce any noise introduced at 10*aa.*

For the Phase0 signal actuation takes place by connecting the two inputs 10*aa* and 10*ab*, which raises the voltage at the non-inverting input to above ½ of Vcc by selecting resistor 77, connected between the input 10*ab* and Vcc, to be about equal to resistor 74, e.g. 1 K. Such an actuation may be conveniently produced by a reed switch or other switch giving a closure on actuation.

Actuation by a negative signal requires more components. Input 10*ac* is connected through a resistor 80 to node point 81 which is held close to ground and positive via diode 82 whose anode is connected to node 81 and cathode is grounded, and via pull-up resistor 83 taken to Vcc. Emitter of an NPN transistor 84 is connected to the node point 81, its base is grounded, and its collector is directly connected to the comparator inverting input. Diode 85 protects the inverting input of comparator 70 from being pulled negative. Capacitor 87 is a high frequency roll-off capacitor. When a sufficiently negative signal appears at the input 10*ac*, node 81 goes negative, transistor 84 conducts, and the inverting input of comparator 70 is pulled close to ground (within a few tenths of a volt of ground) and below the voltage of the non-inverting input, changing the output of the comparator 70 to a high state and resetting the counter 67.

While the use of a counter is for distributorless ignitions, a free running counter (without a phasing circuit) may also be useful in the case of a distributor ignition using multiple in-parallel SCRs which are triggered sequentially to minimize the stress on a single SCR. However, for the preferred hybrid ignition shown applied to a distributor system, a high efficiency high current diode would be used for the shunt switch SD (SD1 or 17*a* shown), with very little current being conducted by the SCR S1 (16*a*), alleviating the need for in-parallel SCRs.

With regard to forming voltages Vcc and Vref, Vcc would preferably be a filtered voltage derived from switched battery voltage input 5*a* connected to resistor 5*b*, isolation diode 5*c*, and filter capacitor 5*d* which provides Vcc, and Vref can be derived in turn from Vcc with a regulator chip 5*e*.

For the dual switches Si and SDi a single switch may be built since the two switches 16*a* and 17*a* share a common anode and triggers. However, the high voltage isolation diode 18*a* is required. We call this device a CDRCAT device, for "Controlled Dual Rectifier Common Anode Trigger".

The main spark firing control strategy disclosed herein relates to reducing the ignition duration with engine speed.

This strategy can be complemented and supplemented by many others known to those versed in the art and disclosed in the prior cited patents and in others. For example, it is a simple matter to add a multi-firing feature to the ignition to further increase spark duration, especially during low engine speeds, and use different forms of ignition circuits which may be more amenable to such operation. Or, for the dual discharge ignition circuit disclosed herein, one can employ two power converter output diodes in place of diode 7*a* (which is an ultra-fast diode since preferably the power converter is operated with a DC component). Each diode can be connected in series with the two capacitors 14, 14*a*, with the diode in series with the low frequency capacitor 14 having a switch in series, e.g. a high voltage FET, which can be turned off when extra spark energy is not required.

Likewise, the power converter disclosed herein is not to be viewed in a limited sense. Its features i.e. high efficiency, high power, compact, light weight, low cost, may have application in other areas where voltage needs to be raised from a low to a higher level. Following the principles disclosed here, and recognizing that the voltage on the main power switch 2 on switch opening is approximately equal to the power supply voltage 3, plus the secondary peak voltage Vc transformed by the transformer 1 turns ratio N (Vs/N), plus the peak switch 2 primary current times the impedance Ze of the transformer leakage inductance Lpe and snubber capacitor Csn (Ze=SQRT[Lpe/Csn] where "SQRT" means square root), then one can select a best trade-off between the switch voltage rating, the turns ratio N, the size of the transformer and of other components, etc., for the particular application. Therefore, the high efficiency, compact power converter disclosed herein should not be considered to be limited to the present automotive ignition application, or even to other ignition applications with differing input or output voltages, but applies to any electrical power system where voltage must be raised from one level to another.

Furthermore, the various features of the converter controller system, e.g. the lossless snubber 6, the very simple current sensor 8*a*, the transformer and power stage design including DC current setting, the very simple and robust power converter controller 8, etc., can be used in other applications as individual circuit blocks and strategies, or in any of a number of possible combinations. The combination disclosed herein, while unique in its relevance to the present application, is not to be interpreted in a limiting sense but as a preferred application of the system.

The term DC (direct current) as used herein, particularly with reference to the transformer primary current Idc, is not to be taken as an average non-zero current which a positive current ramp Iac that ramps from zero to a positive value and back to zero again would exhibit, designated as average current Iave (Iave=Iac/2), but as the positive, constant, or slowly varying current (of near zero ripple) on which an oscillating or ramping up and down current may ride.

It is emphasized with regard to the present invention, that since certain changes may be made in the above apparatus and method without departing from the scope of the invention herein disclosed, it is intended that all matter contained in the above description, or shown in the accompanying drawings, shall be interpreted in an illustrative and not limiting sense.

What is claimed:

1. A DC to DC voltage step-up power converter including energy storage and voltage step-up inductive means and a main power switch means SE for controlling current in said inductive means to raise a low input voltage power supply means to a high output voltage Vc, the power converter including a converter controller comprising controlled oscillator means for turning said switch SE on and off for durations Ton and Toff respectively, the oscillator means including a summing time measuring device which achieves a high measure level HIGH in time Ton and a low subtracting time measuring device which achieves a low measure level LOW in time Toff, the summing occurring until the level HIGH is obtained whereupon the subtracting begins until the level LOW is obtained whereupon the summing begins, and so on, said summing device sensing said high output voltage load at voltage Vc and summing with a rate factor A+ and summing in inverse proportion to the voltage Vc to define the off-time Toff which decreases with increased voltage Vc, and said subtracting device subtracting at a rate A− to define the on-time Ton.

2. An automotive ignition system of the capacitive discharge, CD, type with at least one CD capacitor and at least one coil Ti with switches SSi, and a flyback type voltage step-up power converter and controller for charging said capacitors, said power converter comprising a transformer and power switch SE and low ESR filter capacitors connected to a battery for supplying current to the primary winding of said transformer, and further comprising a current sensing circuit comprised of sensor resistors connected between the low voltage end of the transformer secondary winding and ground and an NPN sensor transistor with its base connected to ground, its emitter connected to the other end of said sensing resistors, and its collector providing a sensing actuating point to control the peak power converter peak current Ipk through feedback to a converter controller driver circuit which turns said power switch SE on and off to charge said CD capacitors.

3. The ignition system as defined in claim 2 wherein said power converter includes snubber means connected between the battery and the drain of said FET switch which is of the N-type, said snubber including snubber capacitor and diode and energy handling components.

4. The ignition system as defined in claim 3 wherein said energy handling components comprises a power resistor of order of magnitude of 1000 ohms.

5. The ignition system as defined in claim 2 wherein said energy handling components comprise an energy storage inductor, a voltage control zener diode, and a diode connected with its anode to ground and its cathode to one end of said inductor, wherein excess energy following switch SE opening is stored in said inductor and delivered back to the battery.

6. The ignition system as defined in claim 5 wherein said energy handling components include an FET switch and control resistors.

7. The ignition system as defined in claim 2 wherein said ignition is of the hybrid dual discharge type including low frequency capacitor C0, high frequency capacitor C1, one or more inductor and diode means, one or more ignition coils Ti with dual switches Si/SDi, where Si is an SCR, and SDi is an SCR for a distributorless ignition and a diode for a distributor ignition.

8. The ignition system as defined in claim 7 wherein inductor means includes at least one inductor Le0 with a series diode connected between said two capacitors, and wherein switch Si is connected with its anode to the low voltage end of the primary winding of said coil Ti and its cathode to ground, and wherein switch SDi has its anode connected to the anode of Si and its cathode to the intersection of said inductor Le0 and capacitor C0, and wherein for a distributorless ignition trigger of said switch SDi has the cathode of a high voltage Vc connected to it and the anode connected to the trigger of switch Si, with trigger signal applied to triggers on ignition firing.

9. The ignition system as defined in claim 7 wherein said capacitors are in the range of values of 1 to 10 microfarads charged to a voltage approximately 360 volts by said power converter and wherein C1 is less than C0.

10. A DC to DC voltage step-up power converter including energy storage and voltage step-up inductive means and a main power switch means SE for controlling current in said inductive means to raise a low input voltage power supply means to a high output voltage Vc, the power converter including a converter controller comprising controlled oscillator means for turning said switch SE on and off for durations Ton and Toff respectively, the oscillator means including a timing capacitor Ct which is charged up to a high threshold voltage Vhth and discharged through a discharge point to a low threshold voltage Vlth to define the two periods Toff and Ton, capacitor Ct being charged through a resistor Rc connected at one end to said discharge point and at the other end to said high output voltage load at voltage Vc to define the off-time Toff which decreases with increased voltage Vc, and timing capacitor Ct discharging through a resistor Rb connected between capacitor Ct and the discharge point to define the on-time Ton, and wherein a diode is placed across resistor Rb for by-passing resistor Rb during charging of timing capacitor Ct through resistor Rc.

11. The power converter as defined in claim 10 wherein said controlled oscillator is built from a 555 timer.

12. The power converter as defined in claim 10 wherein a voltage limiting zener diode is connected to the discharge point with its anode to ground which provides over-voltage protection and a high input power supply voltage shut-off.

13. The power converter as defined in claim 12 wherein the anode of said zener diode is connected to the base of an NPN transistor whose emitter is grounded and whose collector is connected to the timing capacitor Ct to discharge and hold the timing capacitor low whenever the voltage at said discharge point exceeds the zener voltage.

14. The power converter as defined in claim 13 wherein said input power supply is an automotive 12 volt battery and said zener diode has a zener voltage of at least 9.1 volts for power converter shut-off at battery voltages above 18 volts.

15. The power converter as defined in claim 10 wherein said controlled oscillator means comprises a comparator constructed and arranged to operate as an oscillator.

16. The combination as defined in claim 15 wherein said timing capacitor Ct is connected to the inverting input of said comparator to provide a high comparator output during capacitor Ct charging, designating time Toff, and a low comparator output during discharging designating time Ton, wherein the output of said oscillator is connected to a voltage inverting circuit to produce a positive drive signal during time Ton and a low signal during time Toff.

17. The power converter and controller as defined in claim 16 wherein output of said inverting circuit is applied to the bases of complementary NPN and PNP transistors with interconnected bases and emitters and with collectors to Vcc and ground respectively, the emitters in turn providing the turn-on and turn-off drive for said power switch SE through a small resistor shunted with a fast diode for fast turn-off of the switch, said resistor connected between said emitters and the gate of said switch SE which is an FET.

18. The power converter and controller as defined in claim 10 in combination with an ignition controller means for use in an IC engine capacitive discharge, CD, ignition system with one or more CD capacitor means connected to the power converter high voltage output for being charged by the power converter to the high voltage Vc, said ignition controller means constructed and arranged to receive a generic ignition trigger signal comprised of a voltage pulse or points closure and converts that signal to a well defined sharp short duration pulse which is applied to the base of a transistor to produce a variable gate trigger Tg of duration from a fraction of a millisecond, msec, to several milliseconds, which turns-on ignition firing switch means for a time Tg whose duration changes inversely with engine speed of said engine.

19. The combination as defined in claim 18 wherein the output of said trigger comparator is normally high through connection to filtered power supply voltage Vcc through pull-up resistors, which changes to a low state G0 during the gate time Tg, said low triggered state G0 driving an inversion circuit based on a PNP transistor whose emitter is connected to Vcc and whose collector produces the inversion gate signal G which is applied, in turn, to the bases of complementary NPN and PNP transistors with interconnected bases and emitters and with collectors to Vcc and ground respectively, the emitters in turn providing the turn-on and turn-off drive for ignition coil switches SSi.

20. The combination as defined in claim 18 wherein said variable gate Tg is produced by means of a trigger comparator whose inputs, have impressed on them, immediately following the trigger signal, a rising voltage waveform of voltage Vrise and a decaying voltage waveform of voltage Vdec, where Vrise<Vdec, such that the intersection Vrise=Vdec defines the gate trigger duration Tg, and wherein said rising voltage waveform, following intersection and flipping of the comparator output, becomes changed to a decaying voltage waveform Vrd with a longer time constant to define an initial voltage threshold Vri for the initially rising voltage waveform Vrise, where Vri increases with engine speed to reduce gate time Tg with engine speed.

21. The combination as defined in claim 20 wherein the trigger input circuit includes an in-series diode with a point bounce resistor of large resistance across it, a differentiating capacitor, and a voltage divider to the base of said transistor which is an NPN gate producing transistor switch Sdec with collector to a reference voltage Vref and with emitter connected to a timing capacitor Csig shunted by a timing resistor Rsig which define the decaying voltage waveform Vdec which takes on an initial value close to Vref essentially without delay upon switch Sdec turn-on by immediate charging of capacitor Csig, which starts to decay with voltage Vdec on switch Sdec turn-off at the end of said short duration pulse of time much less than gate period Tg, said voltage Vdec being impressed on the inverting input of said trigger comparator through a delay circuit, and wherein a second NPN transistor switch Srise with collector connected to the voltage Vref through a second timing resistor Rrise whose emitter is connected to a second timing capacitor Crd comprises the circuit producing the second voltage rise and decay waveforms Vrise and Vrd by charging up capacitor Crd gradually through resistor Rrise when switch Srise is turned on and discharging it when switch Srise is turned off, with the voltage rise Vrise occurring during the gate time Tg and the decay voltage Vrd after the time Tg, to apply the voltage Vrise to the non-inverting input of the trigger comparator which switches its state when Vrise reaches Vdec, i.e. Vrise=Vdec, turning off switch Srise and allowing capacitor Crd to discharge with voltage waveform Vrd through a capacitor Crd shunt resistor Rsh, greater than Rrise, with a longer time constant than the time constant of the waveform Vrise, and wherein the level to which the voltage Vrd decays Vri is proportional to the engine speed thus putting an initial voltage off-set Vri on Vrise which allows Vrise to reach the level of Vdec more rapidly after trigerring on and off of switch Sdec by said short duration pulse to produce said shorter gate trigger duration Tg with engine speed.

22. The combination as defined in claim 18 wherein the power converter operation is turned off during ignition firing by the output trigger Tg driving a transistor switch which pulls the timing capacitor Ct close to ground.

23. The combination as defined in claim 22 wherein a start-up circuit is provided for restarting the power converter which includes the electrical power source supply of voltage Vcc feeding the power converter and a resistor of order of magnitude of 100 ohms connected between said supply voltage Vcc and the output load capacitor of the power converter through an isolation diode, as well as one or more resistors in the tens to hundreds kohm resistor range connected to the supply voltage Vcc and/or to a lower regulated voltage Vref of said supply for helping provide a limited charge to timing capacitor Ct to speed up its restart without charging the timing capacitor to a level to turn the power converter on when the ignition primary circuit is in an operating mode or in a latched, low voltage, mode.

24. The combination as defined in claim 18 wherein said ignition controller includes a phase conditioner circuit for obtaining ignition firing phasing information and applying it to a counter with output able to drive multiple switches SSi of ignition coils Ti of a distributorless ignition system for a multi-cylinder engine and having said counter properly phase the ignition firing signals which are delivered to said switches SSi.

25. The combination as defined in claim 24 wherein said phase input circuit comprises a phase comparator whose inverting input is connected to a reference voltage Vref through as voltage divider producing a voltage Vinv about half of Vref and whose non-inverting input is connected to Vcc through a voltage divider comprised of a high value first divider resistor connected to the non-inverting input which places a low voltage there of about one volt producing a normally low phase output signal, the comparator having three phase input connections to it:

1) a positive input PHASE+ comprising a resistor connected to the non-inverting input to which is applied a positive voltage signal of value greater than Vinv;
2) a closure input PHASE0 comprising a resistor much smaller than said first divider resistor shunting said first divider resistor when its other end PHASE0 is connected to the PHASE+ input and produces a voltage greater than Vinv;
3) a negative input PHASE− comprising a PNP transistor with grounded base and collector connected to the comparator's inverting input and whose emitter is connected to a voltage node divider point of one resistor connected to Vcc and the other to the input PHASE− such that when the input goes sufficiently negative the transistor base-emitter junction becomes forward biased and the collector, and hence inverting input, is pulled within a few tenths of a volt below ground and held there by a schottky diode, shunted by a capacitor and resistor, whose anode is grounded and cathode is connected to the inverting input.

26. The combination as defined in claim 24 wherein the clock input CLK of the counter is connected to Vcc, the phase output positive signal of said phase conditioner circuit is applied to the reset input, RST, of the counter, and the trigger output low signal G0 of the trigger circuit, which is delayed relative to the phase signal, is applied to the enable, ENA, input of the counter, which causes the counter outputs to sequence starting with the first output which begins the sequencing when the phase signal is received.

27. The power converter as defined in claim 10 wherein said power converter is a flyback converter with said inductive means comprising a step-up transformer including a primary and secondary winding wound concentrically on a magnetic core to provide a low leakage inductance and said switch means SE turning on and off current in the primary winding.

28. The power converter as defined in claim 27 wherein magnetic core of said transformer comprises an ETD E-type ferrite core with an air gap.

29. The power converter as defined in claim 28 wherein snubber switch Sn is not used and the zener itself takes the place of the snubber switch, permitting current flow and energy build-up in snubber inductor Lsn when the snubber capacitor voltage exceeds the zener voltage with said energy being delivered to said input power supply when the zener ceases to conduct as a result of the snubber capacitor voltage drop.

30. The power converter as defined in claim 27 wherein said converter controller includes an active low loss snubber for limiting the peak voltage on switch SE turn-off comprised of a snubber capacitor Csn and series diode, an energy storage inductor Lsn of inductance about 50 uH, a snubber switch Sn connected between said capacitor Csn and inductor Lsn, a diode with anode to ground for providing a path for energy stored in said inductor to be delivered to the converter power supply when said switch Sn opens, and a snubber zener diode Zsn for sensing and controlling the voltage on said snubber capacitor for turning it on and off when the capacitor voltage exceeds or drops below a prescribed value Vsn, and wherein energy stored in said inductor Lsn is delivered before or at the end of the off-time T-off of said controlled oscillator means.

31. The power converter as defined in claim 30 wherein said input power supply is an automotive 12 volt battery and said output voltage Vc is approximately 360 volts and said snubber capacitor is of capacitance Csn of about 0.1 microfarads (uF) and said snubber zener is of zener voltage approximately 24 volts.

32. The power converter as defined in claim 27 wherein said flyback converter controller includes a transformer secondary winding current sensor circuit comprised of a sensor resistor Rsense and an NPN transistor, where Rsense is between a fraction of an ohm and a few ohms and is placed between the end point of the transformer secondary winding and ground and the transistor is placed with its base and emitter across the sensor resistor with its base at ground, its emitter at said secondary winding end point, and its collector is connected to the discharge point, such that following said main switch SE opening and transformer secondary winding current rise above a threshold current Ith the emitter-base junction becomes forward biased at 0.62 volts and the sensor transistor is actuated, i.e. turned on, diverting off-time charging current to capacitor Ct to increase the off-time Toff by an amount proportional to the current overshoot above the threshold current Ith and establish a peak set current level in the transformer and switch SE and protect them from over-current.

33. The power converter as defined in claim 32 wherein a temperature compensating thermistor of negative temperature coefficient, NTC, and an small resistor of zero to a few ohms in series with the thermistor are placed across said sensor resistor to compensate for the change in base-emitter voltage Vbe of said sensor transistor over a temperature range.

34. The power converter as defined in claim 32 wherein the circuit design off-time Toff determined by the resistor Rc is shorter than that required to fully discharge the current in the secondary transformer winding resulting in peak current Ipk build-up which actuates the sensor transistor to increase the off-time and set a steady DC current level Idc and a defined peak current Ipk.

35. The power converter as defined in claim 34 wherein said DC current level is about 10 amps, said peak current Ipk is about 20 amps, and said change in current level Iac is about 10 amps, and said frequency at which the oscillating part of the power converter current Iac ramps up and down between about 10 to 20 amps is about 60 kHz.

36. The power converter as defined in claim 35 wherein the high voltage diode placed at the output of said transformer is an ultra fast diode.

37. The power converter as defined in claim 27 wherein the secondary winding is wound as a single layer of magnet wire around the center post of the magnetic core of said transformer and the primary winding is wound as a single layer on top of said secondary winding to provide lowest leakage inductance.

38. The power converter as defined in claim 37 wherein the primary winding turns Np is approximately 7 turns and the turns ratio N of secondary turns Ns to primary turns, N=Ns/Np, is approximately 12.

39. The power converter as defined in claim 38 wherein the core is a gapped core to provide approximately 12 microhenries (uH) of primary inductance Lp for said approximately 7 primary wire turns.

40. The power converter as defined in claim 39 wherein said input power supply is an automotive 12 volt battery and said output voltage Vc is approximately 360 volts and said switch SE is a 60 volt high efficiency FET switch.

* * * * *